United States Patent
Chang et al.

(10) Patent No.: US 8,370,439 B2
(45) Date of Patent: Feb. 5, 2013

(54) ACTIVATING AUTOMATIC MESSAGING SESSION

(75) Inventors: Sidney Chang, San Jose, CA (US); Naveen Dasa Sanjeeva, Milpitas, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1540 days.

(21) Appl. No.: 11/371,845

(22) Filed: Mar. 9, 2006

(65) Prior Publication Data

US 2007/0214222 A1     Sep. 13, 2007

(51) Int. Cl.
G06F 15/16     (2006.01)
(52) U.S. Cl. ........ 709/206; 709/207; 370/259; 455/466; 455/414.3; 379/211.02
(58) Field of Classification Search .................... 709/206
See application file for complete search history.

(56) References Cited

U.S. PATENT DOCUMENTS

| | | | |
|---|---|---|---|
| 7,120,455 B1 * | 10/2006 | Chen et al. ................. | 455/466 |
| 7,590,696 B1 * | 9/2009 | Odell et al. ................. | 709/206 |
| 2004/0158610 A1 * | 8/2004 | Davis et al. ................. | 709/206 |
| 2005/0125500 A1 * | 6/2005 | Wu ............................. | 709/207 |
| 2005/0141439 A1 * | 6/2005 | Hsu et al. .................... | 370/259 |
| 2006/0271696 A1 * | 11/2006 | Chen et al. .................. | 709/229 |
| 2006/0284838 A1 * | 12/2006 | Tsatalos et al. ............. | 345/156 |
| 2007/0174399 A1 * | 7/2007 | Ogle et al. ................... | 709/206 |

* cited by examiner

*Primary Examiner* — Hua Fan
(74) *Attorney, Agent, or Firm* — Frommer Lawrence & Haug LLP; John W. Branch

(57) ABSTRACT

Methods and systems are directed toward enabling a user of a target device, such as a mobile device, to register for automatic initiation of a messaging service on the target device. A target device user interface, such as a login user interface, provides a selectable activation element for the user to indicate that future messaging sessions with the target device should be established automatically. An activation indicator and target identifier are associated with a user identifier and stored in a messaging system data store. When the user ceases use of a messaging session on another device, such as a general purpose computing device, the messaging system uses the user identifier and target identifier to automatically establish a corresponding messaging session on the target device. The user of the target device may then hold a messaging session with an existing third party device or with a different third party device.

7 Claims, 6 Drawing Sheets

ACTIVATING AUTOMATIC MESSAGING SESSION

FIELD OF ART

The present invention relates generally to messaging, and more particularly, but not exclusively, to registering for automatic establishment of a messaging session on a target device, such as a mobile device.

BACKGROUND

Mobile and stationary client devices often include one or more messaging capabilities such as instant messaging (IM), short message service (SMS), multimedia message service (MMS), email, voice mail, and the like. A growing number of users have multiple devices for messaging. For example, many users have a general purpose computer in an office and use IM to communicate. Some of those users also have a mobile device that is capable of IM communication. When a user leaves the office, the user often wishes to continue receiving and/or sending messages via the user's mobile device. Some messaging systems enable a user to set a forwarding address for incoming messages to be sent to a target device, such as a mobile device. The user often manually initiates a messaging session at the target device to access to forwarded messages. Some other messaging systems enable initiation of a messaging session on the target device, when the user gives an instruction from the general purpose computing device or when the user terminates a messaging session on the general purpose computing device. This initiation of a messaging session is sometimes referred to as "going mobile" or "IM forwarding." Typically, a user navigates a menu structure of the messaging system through a general purpose computing device and submits information about the user's target device to activate the initiation capability. Some users find it difficult to navigate the menu structure, may not know whether their target device is capable of initiating a messaging session on its own, may not know what information is needed, or how to obtain the needed information about their target device, may not understand the initiation capability itself, and/or may have other concerns.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment, an entirely hardware embodiment or an embodiment combining software and hardware aspects. The following detailed description is, therefore, not to be taken in a limiting sense. Briefly stated, embodiments of the present invention are directed towards providing a method and system for enabling a user of a target device, such as a mobile device, to register for automatic initiation of a messaging service on the target device. Registering for automatic initiation enables a user to terminate or otherwise cease use of a messaging session on an original device, such as a general purpose computing device, and have a corresponding messaging session automatically activated on the target device. The user of the target device may then hold a messaging session with an existing third party device or with a different third party device. The embodiment described below discusses registering for automatic initiation of a new messaging session on the target device. However, the invention is not so limited and may include registering for automatic transfer of an existing messaging session, and/or other forms of rerouting messages to the target device.

Illustrative Operating Environment

Figure 1:
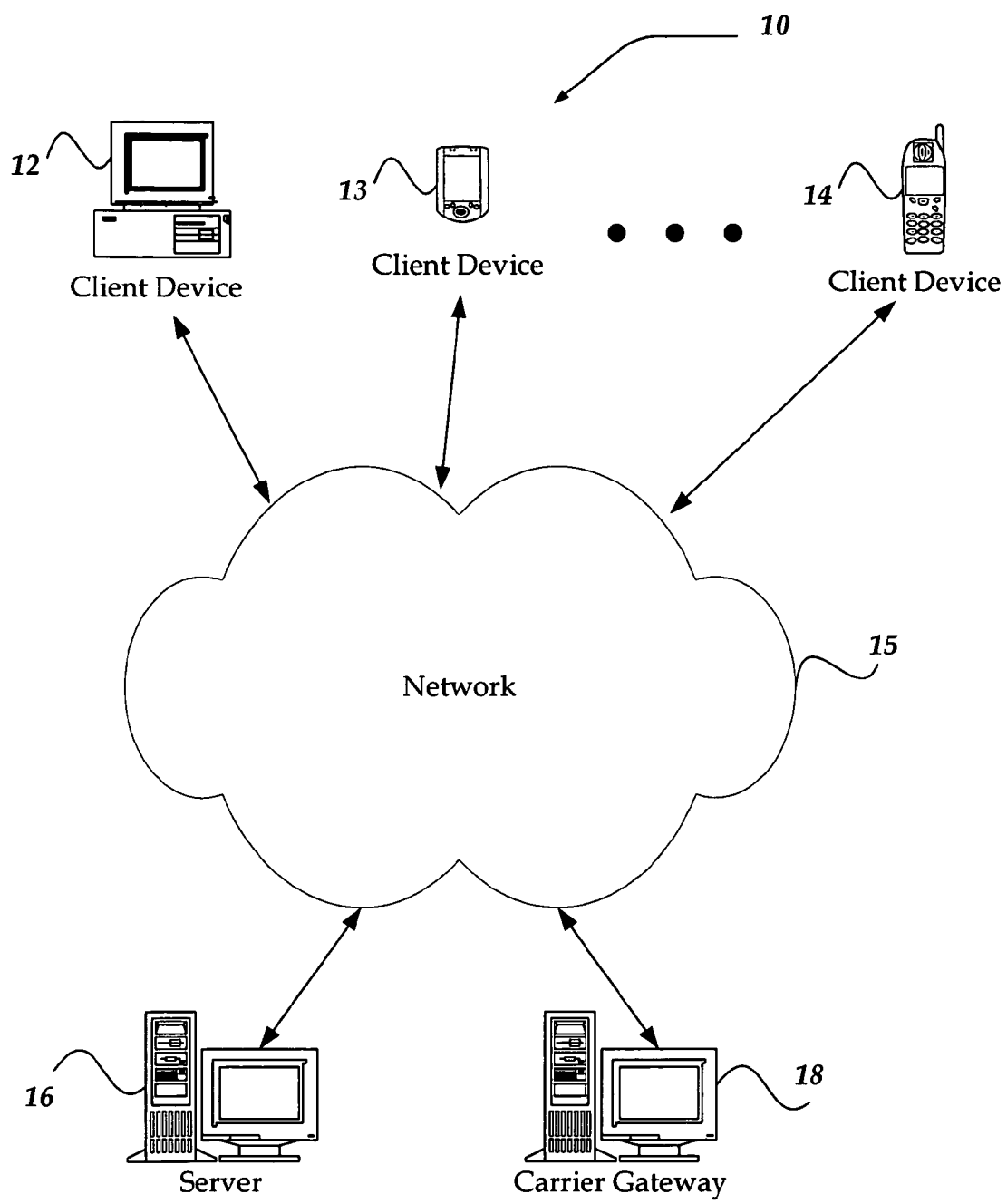
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, a server 16, and a carrier gateway 18. Network 15 is in communication with and enables communication between each of client devices 12-14, server 16, and carrier gateway 18.

Client devices 12-14 may include virtually any computing device capable of receiving and sending a message over a network, such as network 15, to and from another computing device, such as server 16, carrier gateway 18, each other, and the like. The set of such devices may include mobile devices that are usually considered more specialized devices and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium. The set of such devices may also include devices that are usually considered more general purpose devices and typically connect using a wired communications medium such as personal computers, multiprocessor systems, microprocessor-based or programmable consumer electronics, network PCs, and the like.

Each client device within client devices 12-14 includes a user interface that enables a user to control settings, such as an auto-initiation activation setting, and to instruct the client device to perform operations. Each client device also includes a communication interface that enables the client device to send and receive messages from another computing device employing the same or a different communication mode, including, but not limited to IM, SMS, MMS, internet relay chat (IRC), Mardam-Bey's internet relay chat (mIRC), Jabber, email, and the like. Client devices 12-14 may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like.

Network 15 is configured to couple one computing device to another computing device to enable them to communicate. Network 15 is enabled to employ any form of medium for communicating information from one electronic device to another. Also, network 15 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 15 includes any communication method by which information may travel between client devices 12-14, server 16, and/or carrier gateway 18. Network 15 is constructed for use with various communication protocols including transmission control protocol/internet protocol (TCP/IP), user datagram protocol (UDP), WAP, code division multiple access (CDMA), global system for mobile communications (GSM), and the like.

Server 16 may comprise a web server, messaging server, and/or other server. Server 16 may provide one or more services, such as an IM service, an email service, a news service, a sales service, a financial management service, and the like. Carrier gateway 18 may comprise a server or other network node that communicates data between client devices and/or a subset of services, such as between phone carriers, between data services providers, and/or between other service providers. Carrier gateway 18 may perform data conversions, routing, filtering, and/or other services.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, gaseous, liquid, and other wireless media, and wired media such as twisted pair, coaxial cable, fiber optics, wave guides, and other wired media.

One embodiment of a client computing device, such as a mobile client device 20, is described in more detail below in conjunction with FIG. 2. Briefly, client device 20 may include any computing device capable of connecting to network 15 to enable a user to communicate with other client devices, server 16, and/or carrier gateway 18. Client device 20 may include many more components than those shown. The components shown, however, are sufficient to disclose an illustrative embodiment for practicing the invention. Many of the components of client device 20 may also be duplicated in server 16, carrier gateway 18, and/or other server devices.

As shown in the figure, client device 20 includes a processing unit 22 in communication with a mass memory 30 via a bus 24. Mass memory 30 includes a RAM 32, a ROM 34, and other storage means. Mass memory 30 illustrates another example of computer storage media for storage of information such as computer readable instructions, data structures, program modules or other data. Mass memory 30 stores a basic input/output system ("BIOS") 40 for controlling low-level operation of client device 20. The mass memory also stores an operating system 41 for controlling the operation of client device 20. It will be appreciated that this component may include a specialized mobile communication operating system such as Windows Mobile™, or the Symbian® operating system, or a general purpose operating system such as a version of UNIX, or LNUX™. The operating system may include, or interface with a Java virtual machine module that enables control of hardware components and/or operating system operations via Java application programs.

Memory 30 further includes one or more data storage units 42, which can be utilized by client device 20 to store, among other things, programs 44 and/or other data. Programs 44 may include computer executable instructions which, when executed by client device 20, transmit, receive, and/or otherwise process messages (e.g., IM, SMS, MMS, email, and/or other messages), audio, video, and enable telecommunication with another user of another mobile device. Other examples of application programs include browsers, contact managers, calendars, task managers, transcoders, database programs, word processing programs, spreadsheet programs, games, and so forth. In addition, mass memory 30 stores a messaging client 46. Messaging client 46 includes computer executable instructions, which may be run under control of operating system 41 to enable and manage message exchanges with other client devices 12-14, network 15, server 16, carrier gateway 18, and the like.

Exemplary mobile device 20 also includes a power supply 26, one or more wireless interfaces 50, an audio interface 52, a display 54, a keypad 56, an illuminator 58, an input/output interface 60, a haptic interface 62, and an optional global positioning systems (GPS) receiver 64. Power supply 26 provides power to client device 20. A rechargeable or non-rechargeable battery may be used to provide power. The power may also be provided by an external power source, such as an AC adapter or a powered docking cradle that supplements and/or recharges a battery.

Client device 20 may optionally communicate with a base station (not shown), or directly with another mobile device. Wireless interface 50 includes circuitry for coupling client device 20 to one or more wireless networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), and the like.

Audio interface 52 is arranged to produce and receive audio signals such as the sound of a human voice. For example, audio interface 52 may be coupled to a speaker and microphone (not shown) to enable telecommunication with others and/or generate an audio acknowledgement for some action. Display 54 may be a liquid crystal display (LCD), gas plasma, light emitting diode (LED), or any other type of display used with a mobile device. Display 54 may also include a touch sensitive screen arranged to receive input from an object such as a stylus or a digit from a human hand.

Keypad 56 may comprise any input device arranged to receive input from a user. For example, keypad 56 may include a push button numeric dial, a QWERTY keyboard, or other keypad. Keypad 56 may also include command buttons that are associated with selecting and sending images. Illuminator 58 may provide a status indication and/or provide light. Illuminator 58 may remain active for specific periods of time or in response to events. For example, when illuminator 58 is active, it may backlight the buttons on keypad 56 and stay on while the mobile device is powered. Also, illuminator 58 may backlight these buttons in various patterns when particular actions are performed, such as dialing another mobile device. Illuminator 58 may also cause light sources positioned within a transparent or translucent case of the mobile device to illuminate in response to actions.

Figure 2:
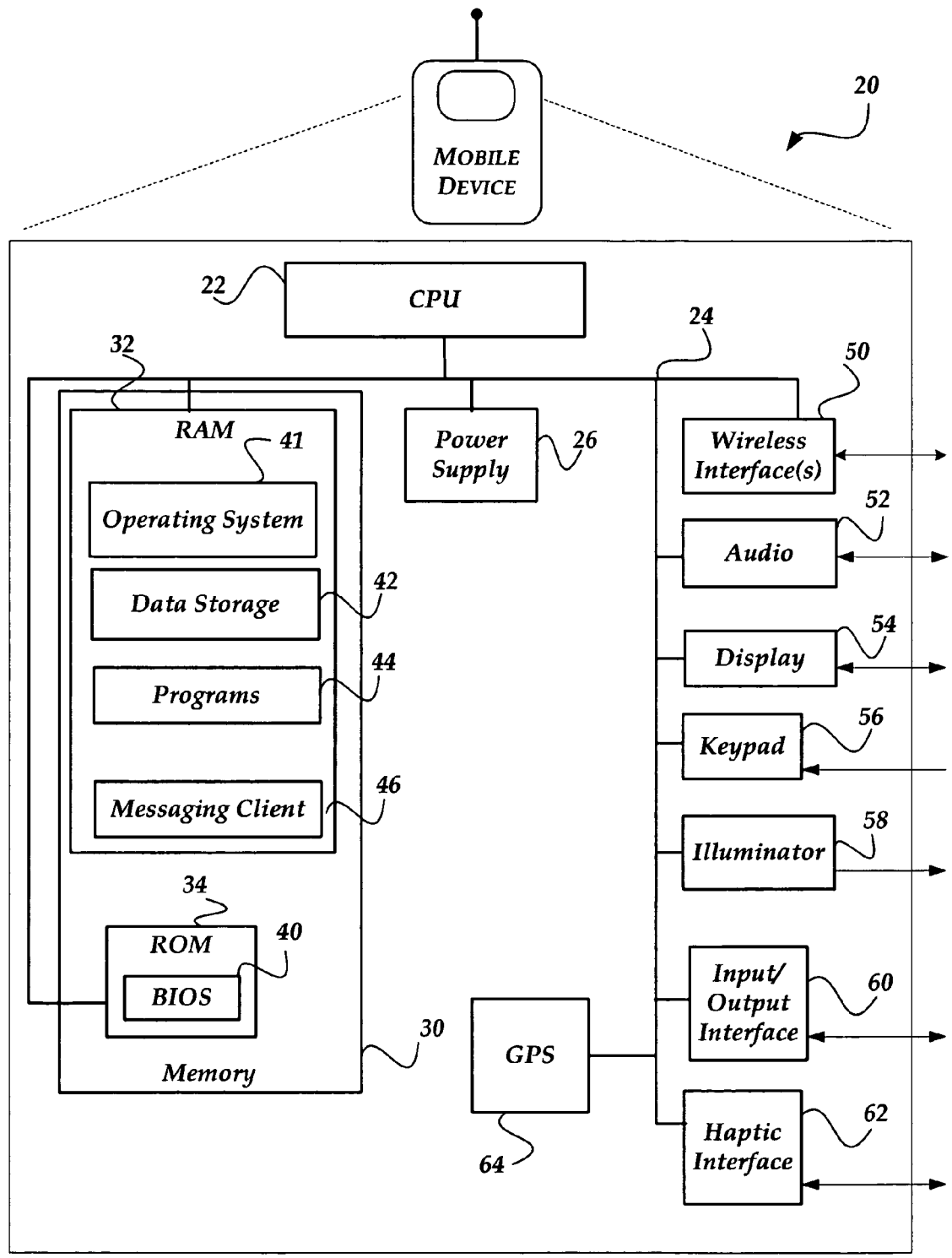
FIG. 2 shows one embodiment of a client and/or server device that may be included in a system implementing the invention.

Client device 20 also comprises input/output interface 60 for communicating with external devices, such as a headset, external keyboard or other input or output devices not shown in FIG. 2. Input/output interface 60 can utilize one or more communication technologies, such as USB, infrared, Bluetooth™, and the like. Haptic interface 62 is arranged to provide tactile feedback to a user of the client device. For example, the haptic interface may be employed to vibrate client device 50 in a particular way when another user is calling.

Optional GPS transceiver 64 can determine the physical coordinates of client device 20 on the surface of the Earth, which typically outputs a location as latitude and longitude values. GPS transceiver 64 can also employ other geo-positioning mechanisms, including, but not limited to, triangulation, assisted GPS (AGPS), E-OTD, CI, SAI, ETA, BSS and the like, to further determine the physical location of client device 20 on the surface of the Earth. It is understood that under different conditions, GPS transceiver 64 can determine a physical location within millimeters for client device 20; and in other cases, the determined physical location may be less precise, such as within a meter or significantly greater distances.

Figure 3A:
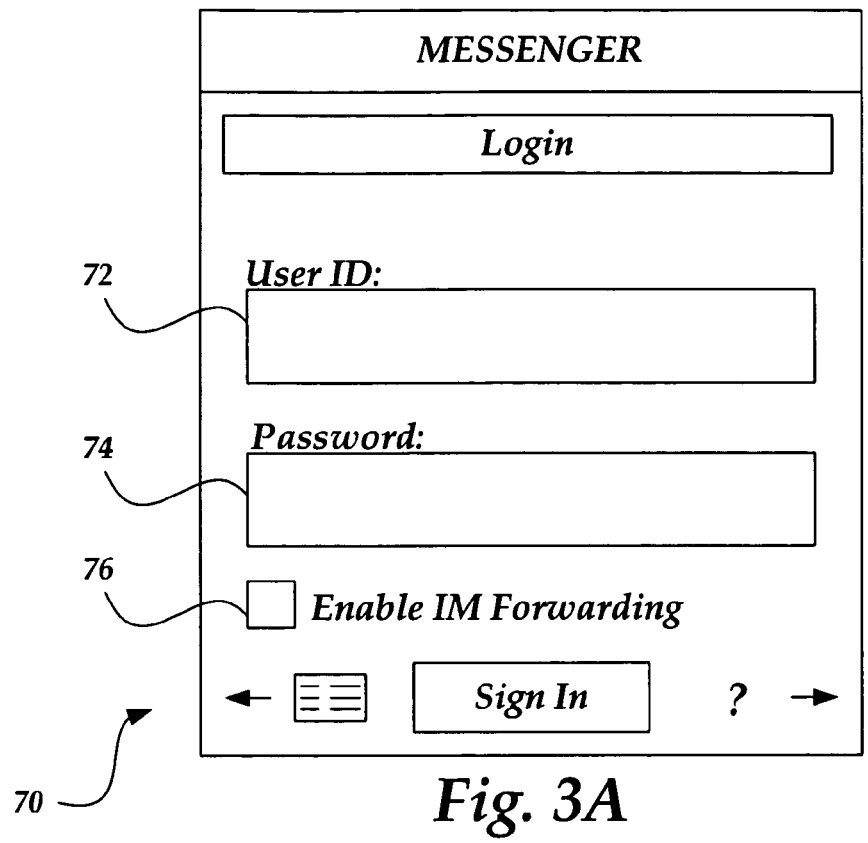
FIG. 3A shows a screen shot of a display on a mobile client device illustrating a login user interface.

FIG. 3A shows a screen shot of a display on a mobile client device illustrating a login user interface 70. In this exemplary embodiment the mobile device acts as a target device to which messages will be routed if automatic initiation of a messaging client is indicated. The user interface includes a user identification (ID) input field 72 and a password input field 74. Login user interface 70 also includes an activation control 76 that enables a user to indicate that the user wishes to register for and activate automatic initiation of the messaging client and transfer of messages to the target mobile device. In this embodiment, the activation control comprises a check box. Any other control may be used, such as a radio button, a drop down selection, or other user interface control. If the user selects the activation control, one or more types of messages, such as instant messages, will be automatically sent to the target client device when the user is not logged in through another device, such as a general purpose computing device.

Figure 3B:
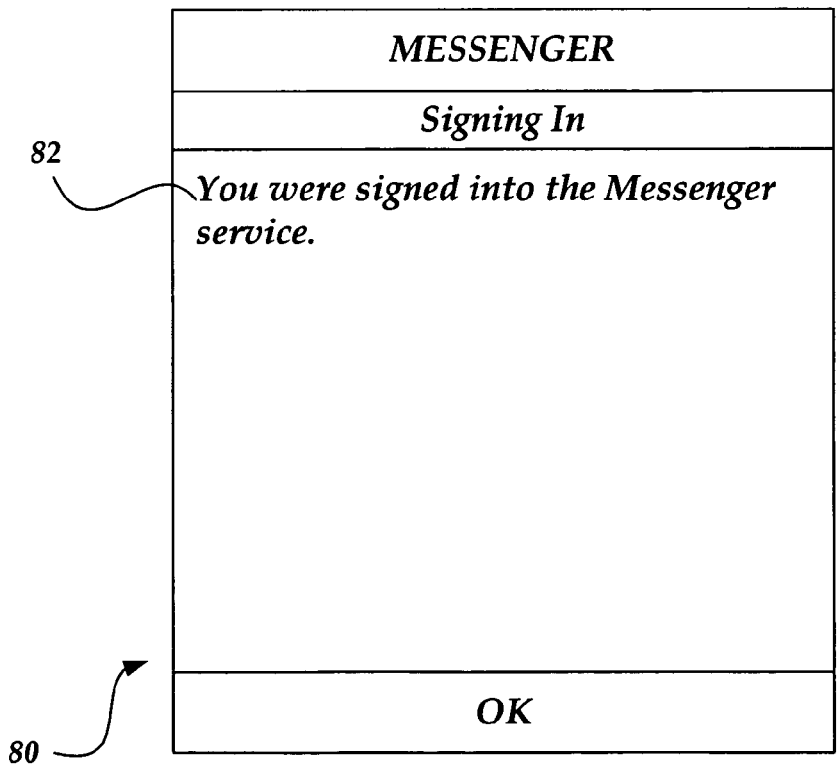
FIG. 3B shows a screen shot of a display on the target mobile client device illustrating an automatic login interface.

FIG. 3B shows a screen shot of a display on the target mobile client device illustrating an automatic login interface 80. When the user has activated the automatic initiation, and the user exits a first messaging system, such as an instant messaging system on general purpose computing device, a corresponding messaging session is automatically initiated with the target device. A session initiation message 82 may be displayed to notify the user that the messaging session has been automatically initiated.

Figure 4:
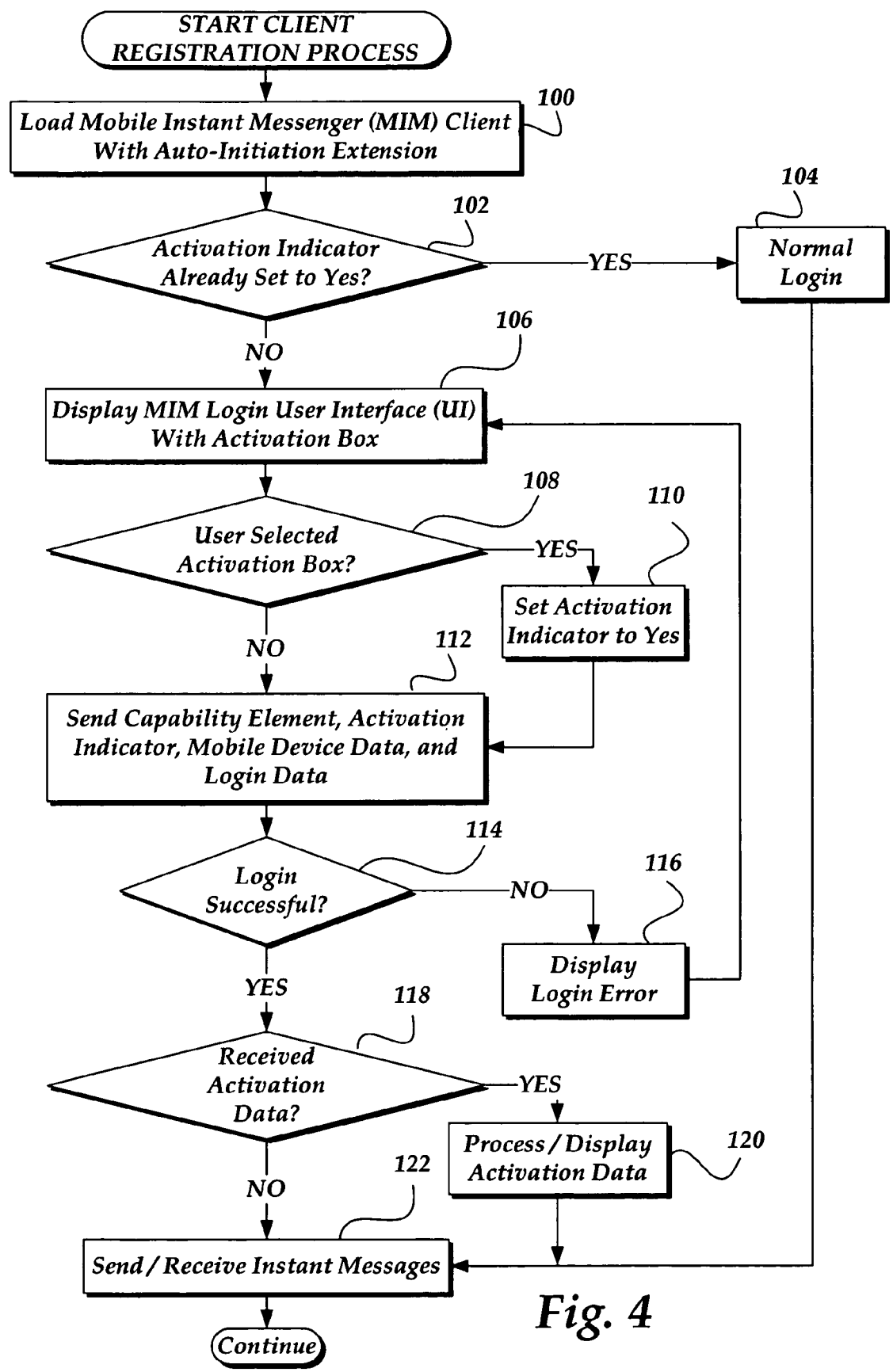
FIG. 4 is a flow diagram illustrating exemplary logic for a client registration process.

FIG. 4 is a flow diagram illustrating exemplary logic for a client registration process. A user may manually register for the automatic initiation through a menu sequence of account settings using a general purpose computing device or the target device. However, activation through the target device while logging into the messaging service makes it easier and faster for a user to activate the automatic initiation capability. In this embodiment, a mobile instant messenger (MIM) client is loaded on a target mobile client device at an operation 100. The MIM client may conform to an open protocol, such as that established by the Open Mobile Alliance™. However, the MIM client includes an extension or other additional module that conforms to the present invention to implement auto-initiation. Upon loading, the MIM extension may evaluate the target device to determine whether it is capable of supporting one or more messaging services that are compatible with auto-initiation. If the target device supports such a messaging service, a capability indicator may be set, if it wasn't set during a prior load. In addition, or alternatively, the capability indicator may indicate the presence of the MIM extension and/or another module that is capable of initiating a messaging session on the target device upon receipt of a corresponding instruction from a server. The capability indicator may be implemented as a variable, a bit, a database entry, and/or other capability indicator.

In this embodiment, the MIM extension also includes an activation indicator, which indicates whether auto-initiation is enabled. The activation indicator may also be implemented as a variable, a bit, a database entry, and/or other activation indicator. At a decision operation 102, the MIM extension determines whether the activation indicator is already set. The activation indicator may have been set during a prior use of the MIM extension, during user operation of a menu sequence, during manufacture of the target device, and/or at other times. If the activation indicator is already set, a conventional login user interface is displayed at an operation 104. The conventional login user interface does not need to include a selectable control to set the activation indicator. However, a selectable control may be displayed that enables the user to deselect activation, thereby deactivating auto-initiation.

If the activation indicator is not already set, the MIM extension instructs the target device to display a MIM login user interface with a selectable control, at an operation 106. The user interface shown in FIG. 3A is one example. The user may then enter a login ID and password. The user may also choose to select the activation control. The user will also generally select a button or other control to submit the entered information. At a decision operation 108, the MIM extension determines whether the activation control was selected. If the activation control was selected, the MIM extension sets the activation indicator, at an operation 110, to indicate the user's choice to activate auto-initiation.

In either case, the MIM or other module of the target device sends the activation indicator and login data to a messaging service at an operation 112. If not already submitted, the target device may also send the capability indicator and/or target device data. The target device data may comprise a target device identifier, such as a telephone number, a mobile identification number (MIN), a network address, and/or other identifier. The target device data may further include details about capabilities, location, ownership, and/or other information about the target device. The above data may be sent to a messaging service embodied as an IM service, an SMS service, an MMS service, and/or other messaging service. The messaging service may be implemented with one or more portal servers, carrier gateway servers, and/or other messaging servers. At a decision operation 114, the target device determines whether the login was successful. If the login was not successful, the target device displays an error message at an operation 116 and control returns to operation 106 to enable the user to enter alternate login data.

However, if the login was successful, the MIM extension determines, at a decision operation 118, whether activation data was received. Activation data generally includes a confirmation that the messaging service registered the user for automatic initiation. The confirmation may be stored in addition to, or as an alternative to the activation indicator set earlier. Other activation data may include one or more messaging service network addresses, ports, security parameters, configuration settings, and/or other data. If activation data was receive, the MIM extension stores, displays, and/or otherwise processes the activation data at an operation 120. For example, the MIM extension may instruct the target device to display a confirmation message, display a request for preference information, set configuration values, and the like.

If the activation data is processed, or if the activation indicator was already set prior to login, the MIM is prepared to send and/or receive messages at an operation 122. If activation data was not received, the MIM may still send and/or receive messages if the login was successful.

Figure 5:
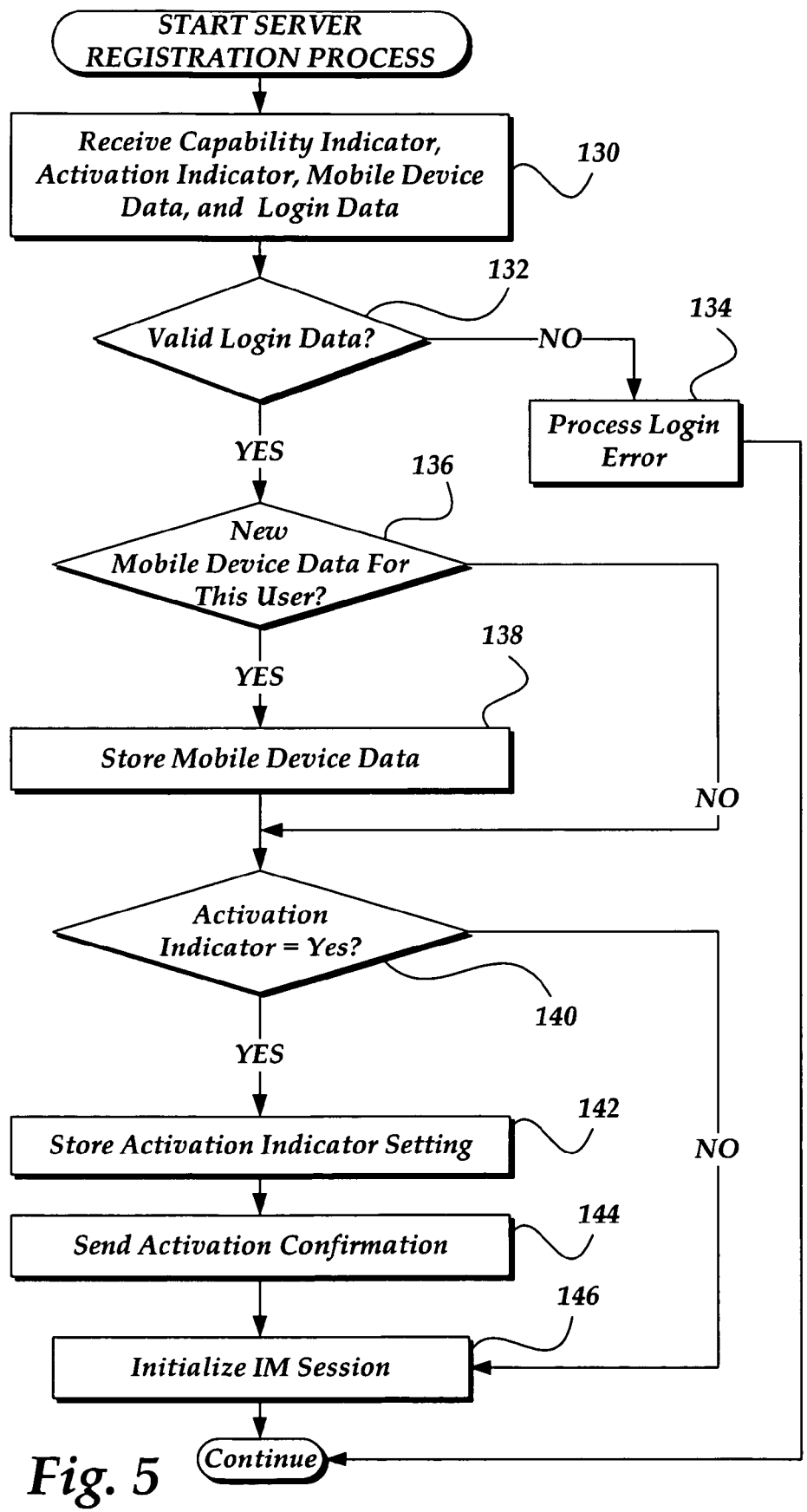
FIG. 5 is a flow diagram illustrating exemplary logic for a messaging server to perform a registration process for automatic initiation of a client messaging session.

FIG. 5 is a flow diagram illustrating exemplary logic for a messaging server to perform a registration process for automatic initiation of a client messaging session. At an operation 130, the server receives the capability indicator, the activation indicator, target device data, and login data from a target device. At a decision operation 132, the server determines whether the login data is valid. If the login data is not valid, the server returns a denial message and/or processes an error at an operation 134.

If the login data is valid, the server determines, at a decision operation 136, whether the received device data corresponds to a new target device for this user. If new target device data is received, the server stores the new target device data at an operation 138. The new target device data may be added to a table or database and indicate an additional device or an alternate device to which messages may be automatically routed. For example, one target device may be identified as a primary target device and another target device may be identified as a secondary device to which messages are routed if the primary device is not accessible. The target device data is also associated with the user ID.

At a decision operation 140, the server determines whether the received activation indicator has a value indicating that the user wants automatic initiation activated. If the received activation indicator is set to indicate automatic initiation, the activation indicator setting is stored at an operation 142. At an operation 144, an auto-initiation activation confirmation is returned to the target device. The server is then ready to automatically initiate a messaging session for the target device the next time the user terminates a messaging session from a general purpose computing device or other device. Regardless of whether the received activation indicator was set, the server will still start a messaging session with the target device at an operation 146, as long as the login data was valid.

Figure 6:
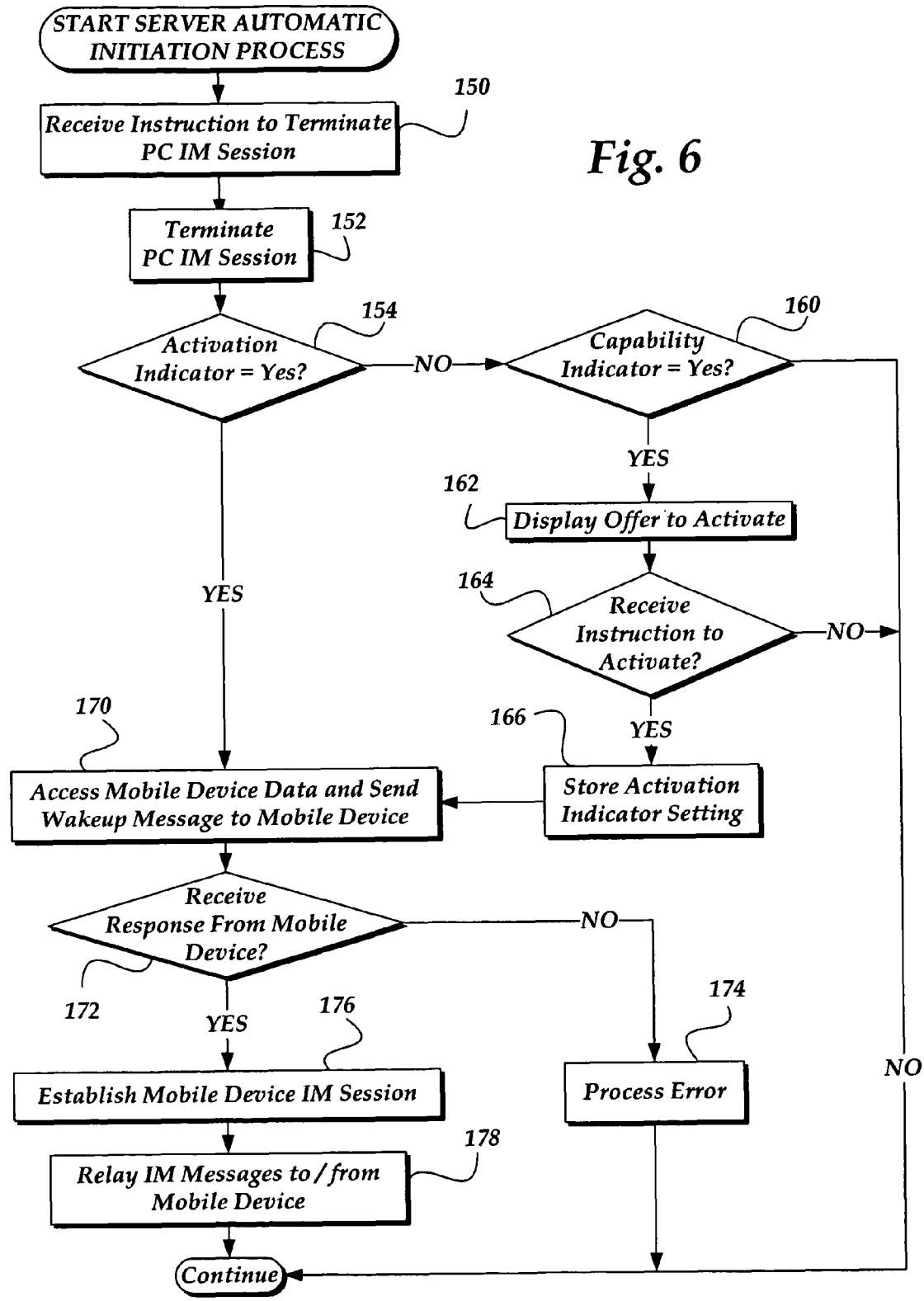
FIG. 6 is a flow diagram illustrating exemplary logic for a messaging server to automatically initiate a messaging session with a target device.

FIG. 6 is a flow diagram illustrating exemplary logic for a messaging server to automatically initiate a messaging session with a target device. At an operation 150, the server receives an instruction from a first client indicating that the user wishes to terminate a current messaging session. For example, the user may be communicating with the server via an IM client on a general purpose computing device, and the user may instruct the IM client to logout of the current IM session. A corresponding logout instruction will generally be sent to the server along with a user ID, client address, and/or other information that enables the server to terminate the messaging session. The server terminates the messaging session with the first client at an operation 152.

At a decision operation 154, the server determines whether the stored activation indicator associated with this user was set to indicate automatic initiation. If the activation indicator does not indicate automatic activation is desired, the server checks the capability indicator, at a decision operation 160, to determine whether mobile device data indicates that the user has previously used a target device capable of initiating a messaging session. If either indicator is not set appropriately, the server simply continues with other operations. However, if the server determines that capability indicator is set to yes, the server sends a message to the first client, at an operation 162, to display an offer to activate automatic initiation. The user may alternatively navigate a menu or otherwise submit a request via the first client to activate automatic initiation. At a decision operation 164, the server determines whether a response was received, instructing the server to active automatic initiation. If a response was not received within a predefined period, or a received response does not instruct the server to activate automatic initiation, the server continues with other operations. If a received response does instruct the server to activate automatic initiation, the server stores the activation indicator setting at an operation 166.

If the activation and capability indicators are set appropriately, the server accesses data regarding the target device and contacts the target device at an operation 170. For example, the server may look up the telephone number, MIN, network address, and/or other data associated with the target device. The server may use the data to send a wakeup message, such as an SMS message, to the target device. The wakeup message may be sent directly to the target device, relayed through a carrier gateway, or otherwise routed to the target device. The wakeup message may cause the target device to display a message, asking whether the user wishes to initiate the messaging client and establish a messaging session. Alternatively, the wakeup message may cause the target device to automatically initiate the messaging client and establish the messaging session. Details of at least one embodiment of a wakeup process is described in U.S. patent application Ser. No. 11/084,769, filed Mar. 18, 2005, the entire contents of which are hereby incorporated by reference.

At a decision operation 172, the server determines whether it has received a response from the target device. The server may wait for a predetermined period of time, make multiple attempts to contact the target device, and/or check another cutoff threshold. If the server does not receive a valid response from the target device, the server may provide an error message to the first client and/or otherwise process an error at an operation 174.

If the server receives a valid response from the target device, the server establishes a messaging session with the target device at an operation 176. If the new messaging session is established correctly, the server relays, or otherwise enables messages to be communicated to and/or from the target device via an operation 178. The messages may be routed directly through the server, through a carrier gateway, and/or through another routing mechanism from and/or to a third party device.

The above specification, examples, and data provide a complete description of the manufacture and use of the composition of the invention. For example, the MIM extension may be downloaded to the target device and/or run through a browser. Also, the activation control may be provided in other portions of the user interface. For instance, a selectable activation control may be displayed in a corner of a messaging display screen, so that the user may activate the auto-initiation feature at any time during a messaging session on the target device or on another device. The activation control may be removed from the display once the user selects the activation control, or it may remain displayed so the user may deselect. Since many embodiments of the invention can be made without departing from the spirit and scope of the invention, the invention resides in the claims hereinafter appended.

What is claimed is:

1. A system for activating communication, comprising:
   a target device, including:
      an interface device that is operative to communicate over a network;
      a processor device that is operative to execute instruction that perform a plurality of actions, including:
         sending a user identifier (ID), target device data, and an activation indicator indicating whether auto-initiation is enabled; and
   a server device that includes another interface device to communicate over the network and another processor device that is operative to execute instructions that perform a plurality of actions, comprising:
      receiving from the target device the activation indicator, user ID, and target device data;
      storing the target device data and activation indictor for the user ID;
      receiving from a computer device the user ID and an instruction to logout of a current messaging session;
      upon determining that the activation indicator for the user ID indicates an automatic initiation of a messaging client on the target device, using the stored target device data to send a wakeup message to the target device to automatically initiate the messaging client and establish a new messaging session on the target device; and
      routing messages between the target device and a third party device for the newly established messaging session, wherein
      the activation indicator, user ID and target device data is received during a login operation on the target device.

2. The system of claim 1, wherein the target device is one of the following; a mobile device and a general purpose computing device.

3. The system of claim 1, wherein the established messaging session comprises one of the following; an instant messaging session, a short message service session, or a multimedia message service session.

4. A server device, comprising:
   a memory that stores instructions; and
   a processor that executes the stored instructions and performs actions, including:
      receiving from a target device an activation indicator, a user identification (ID), and target device data;
      storing the target device data and activation indicator for the user ID;
      receiving from a computer device an instruction to logout of a current messaging session and the user ID;
      upon determining that the activation indicator for the user ID positively indicates an automatic initiation of a messaging client on the target device, using the stored target device data to send a wakeup message to the target device to automatically initiate the messaging client and establish a new messaging session on the target device; and
      routing messages between the target device and a third party device for the established messaging session, wherein
      the activation indicator, user ID and target device data is received during a login operation on the target device.

5. The server device of claim 4, wherein receiving from the target device the activation indicator, user identification (ID), and target device data further comprises receiving a capability indicator that indicates a messaging capability of the target device.

6. The server device of claim 5, wherein the processor performs actions, further including:
   if the determination of the activation indicator negatively indicates automatic activation and the capability indicator indicates that the user ID has previously used a target device capable of initiating a messaging session, sending a new message to the target device to display an offer to activate automatic initiation.

7. The server device of claim 4, wherein the target device data includes at least one of a target device identifier, capabilities, location, or ownership about the target device.

* * * * *